United States Patent [19]

Reddy et al.

[11] Patent Number: 4,519,882

[45] Date of Patent: May 28, 1985

[54] ISOTOPE SEPARATION BY LASER EXCITATION OF UNIMOLECULAR REACTANTS

[75] Inventors: Kammalathinna V. Reddy, Parsippany; Michael J. Berry, Chatham, both of N.J.

[73] Assignee: Allied Corporation, Morris Township, Morris County, N.J.

[21] Appl. No.: 52,384

[22] Filed: Jun. 27, 1979

[51] Int. Cl.[3] .............................................. B01D 59/01
[52] U.S. Cl. .......................... 204/158 R; 204/DIG. 11
[58] Field of Search ................... 204/158 R, 157.1 R, 204/DIG. 11

[56] References Cited

U.S. PATENT DOCUMENTS

| | | | |
|---|---|---|---|
| 3,947,335 | 3/1976 | Marling | 204/158 R |
| 4,000,051 | 12/1976 | Kaldor | 204/157.1 R |
| 4,029,558 | 6/1977 | Marling | 204/158 R |
| 4,029,559 | 6/1977 | Marling | 204/158 R |
| 4,064,025 | 12/1977 | Chen | 204/158 R |
| 4,120,767 | 10/1978 | Bittenson et al. | 204/158 R |
| 4,202,741 | 5/1980 | Hartford, Jr. et al. | 204/158 R |

OTHER PUBLICATIONS

Brauman, et al., *Optics Comm.* 12:223 1974.
Reddy, K. V. et al., *Chem. Phys. Lett.* 52(1):111–116, Nov. 15, 1977.
Kleinermanns, C. et al., *Chem. Abs.* 89: 89896e, 1978.

*Primary Examiner*—Deborah L. Kyle
*Attorney, Agent, or Firm*—James Riesenfeld; Gerhard H. Fuchs

[57] ABSTRACT

A laser isotope separation process is disclosed which comprises selectively exciting to a high vibrational state of the ground electronic state a polyatomic molecule of a gaseous composition which contains a particular isotope of an element bound to hydrogen. The excited molecule undergoes a unimolecular reaction to yield a product which is enriched in the particular isotope. The product may then be conveniently separated from the starting gaseous composition by conventional means and used in scientific research, medicine, agriculture, or power generation.

3 Claims, 6 Drawing Figures

ISOTOPE SEPARATION BY LASER EXCITATION OF UNIMOLECULAR REACTANTS

BACKGROUND OF THE INVENTION

1. Field of the Invention

This invention relates to enrichment and separation of isotopes, in particular to laser isotope separation by one-photon excitation of unimolecular reactants to high vibrational states/within the ground electronic state.

2. Description of the Prior Art

Efficient isotope separation is the goal of considerable research worldwide. Pure isotopes are needed to meet a growing demand in scientific research, medicine, agriculture, and power generation. Much success has been achieved in separation based on isotope-selective photo excitation using lasers. Three review articles have summarized this work (V. S. Letokhov and C. B. Moore, Sov. J. Quant. Electron. 6, 129, 259 (1976); N. G. Basov, et al., Sov. Phys. Usp., 20, 209 (1977); and R. N. Zare, Scient. Amer. 236, 2, 86 (1977)).

Direct laser excitation to high vibrational states of molecules was reported by Ambartsumyan, et al., JETP Lett. 15, 237 (1972). Those workers selectively excited the third vibrational state of the HCl molecule using a Q-switched neodymium laser. Based on the dependence of luminescence intensity on the laser excitation wavelength, they determined that the excitation was isotope-selective and speculated about using the process for isotope separation.

Brauman, et al. (Optics Comm. 12, 223 (1974)) proposed unimolecular photoisomerization as an isotope separation method. Their paper treats the subject generally, suggesting neither specific molecules nor laser systems for use in the process. Unimolecular decomposition is an element of laser isotope separation processes disclosed by Kaldor in U.S. Pat. No. 4,000,051, issued Dec. 28, 1976, and by Hartford and Tuccio (Chem. Phys. Lett. 60, 431 (1979)). However, these processes involve multiphoton excitation, which has disadvantages discussed below. The Kaldor process also requires the additional step of attaching thermal electrons to vibrationally excited compounds before decomposition takes place.

Tuccio, et al. (1975 IEEE/OSA Conference on Laser Engineering and Applications, Washington, D.C.) reported on uranium isotope separation by selective photoionization using a two-laser technique. First, uranium which had been thermally excited to the first metastable state was selectively excited to a higher state with radiation from a xenon ion laser. The xenon laser was tuned using a temperature stabilized intra-cavity etalon, which provides only a narrow tuning range. Subsequently, the excited atoms were ionized with radiation from a krypton ion laser. This ionization was accomplished in the intra-cavity mode; i.e., the uranium atoms were excited while in a vacuum chamber intra-cavity to the krypton laser. Intra-cavity excitation was disclosed as part of a laser isotope separation process by Niemann, et al. in U.S. Pat. No. 4,072,590, issued Feb. 7, 1978. Their process, however, requires a "chemical reaction partner" in addition to the gas containing the isotopes to be separated; i.e., their process is bimolecular.

Recently, an intra-cavity dye laser technique was used to isomerize unimolecular reactants (K. V. Reddy and M. J. Berry, Chem. Phys. Lett. 52, 111 (1977)). In that work, methyl isocyanide ($CH_3NC$) was excited by direct one-photon excitation to a high vibrational state of the ground electronic state with resultant isomerization to acetonitrile ($CH_3CN$).

Unimolecular isomerization has not been considered a promising route to laser isotope separation. In referring to that process, Letokhov and Moore ("Chemical and Biochemical Application of Lasers," Vol. III, ed. C. B. Moore, Academic Press, New York, 1977, p. 72) indicated that most molecules for which unimolecular isomerization has been studied are too large and complex to be likely to exhibit well-resolved isotopic shifts.

SUMMARY OF THE INVENTION

In accordance with the present invention, a process for producing isotopically enriched material comprises exposing a gaseous composition comprising a particular isotope of an element and at least one other isotope of the same element, said isotopes being bound to hydrogen in a polyatomic molecule, to electromagnetic radiation of a predetermined wavelength from a laser, which radiation, by direct one-photon excitation, preferentially excites molecules containing said particular isotope of said element to an excited vibrational state of the ground electronic state, thereby converting said excited molecules by a unimolecular reaction to a form in which they may be separated from the nonexcited molecules; and separating said converted molecules from said nonexcited molecules. Such separation may be accomplished by conventional means such as distillation.

The process of this invention provides isotope-selective direct excitation of high vibrational states ($v=4$ or higher) of molecules. Direct excitation greatly minimizes isotopic scrambling by collisional energy transfer, since unimolecular reaction rates (typically $\sim 10^8 - 10^{10}$ sec$^{-1}$) are much faster than collisional encounter rates at pressures $\lesssim 40$ kPa. Thus, this process is more highly state-selective than is multiphoton excitation, which leads to a broad distribution over states in the quasicontinuum region of excitation and which is generally feasible only at low pressures ($\lesssim 1$ kPa).

Another drawback of multiphoton excitation is avoided by the present invention. The multiphoton process requires sharp focusing of the laser beam, which causes serious problems in scaling up from laboratory- to production-scale operation. The present process, using multi-pass, non-focused excitation, avoids these problems.

In one embodiment, a gas comprising the isotopes to be separated is irradiated with visible or near infrared photons inside the cavity of a dye laser. With a single laser apparatus and suitable reagents, one can separate a variety of isotopes—including carbon, nitrogen, hydrogen, oxygen and boron—by taking advantage of the easy tunability of dye lasers. Although dye laser photons are generally more expensive than photons provided by some infrared lasers, the advantages of laser tunability and high sample pressure operation often outweigh that cost consideration. Moreover, as laser technology progresses, the cost of intense beams of visible photons is likely to decrease, making the present process even more practical.

DESCRIPTION OF THE PREFERRED EMBODIMENTS

This invention comprises a laser isotope separation process based on one-photon excitation of high vibrational states ($v \geq 4$) of unimolecular reactants. The process is particularly useful for separating isotopes in polyatomic gaseous hydrides which undergo unimolecular reactions when excited by photons in a wavelength range from about 400 to 1000 nm. In this wavelength range, the hydrogenic stretching vibrations have relatively high absorption coefficients compared with alternative excitation modes. When different isotopes of an element are bound to hydrogen in these molecules, different vibrational absorption spectra result. The absorption spectra generally have isotope shifts large enough to permit isotope-selective excitation of high vibrational states of the ground electronic state. For example, in methylamine, the $4\nu_{NH}$ band peak for $CH_3^{15}NH_2$ is separated by 28 cm$^{-1}$ from the $CH_3^{14}NH_2$ peak, while in methanol the $4\nu_{OH}$ band peak for $CH_3^{18}OH$ is separated by 39 cm$^{-1}$ from the $CH_3^{16}OH$ peak. In those gases where the vibrationally excited state undergoes a unimolecular reaction, that reaction yields an isotope-enriched product which is readily separable from the unexcited gas by conventional means, for example, by distillation.

The process of this invention is particularly suitable for producing isotopically enriched material by photoisomerization of gaseous alkyl or alkenyl isocyanides, preferably containing from 1 to 5 carbon atoms. Among these isocyanides, methyl isocyanide ($CH_3NC$) and allyl isocyanide

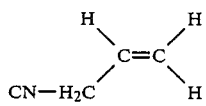

are suitable media for separating carbon or hydrogen isotopes, particularly carbon. Apparatus similar to that described in Chem. Phys. Lett. 52, 111 (1977) may be used. When $CH_3NC$ is used, a mixture of $^{12}CH_3NC$ and $^{13}CH_3NC$ is irradiated, preferably intra-cavity, with a cw dye laser tuned to a wavelength at or near the peak corresponding to a high overtone of the C-H stretch for one of the isotopes to be separated.

Figure 1:
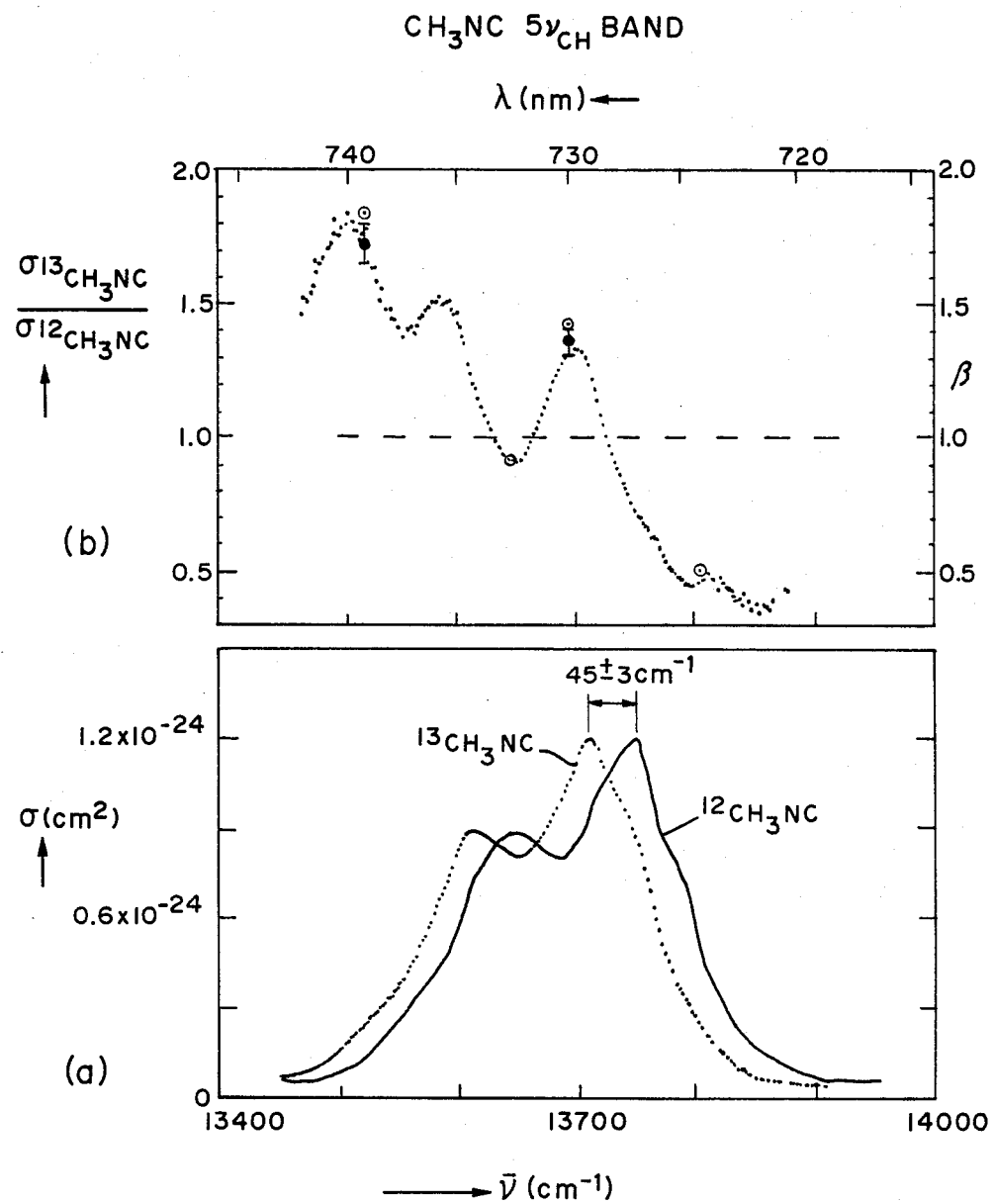
FIG. 1(a) depicts the photoacoustic spectra of $^{13}CH_3NC$ and $^{12}CH_3NC$ $5\nu_{CH}$ overtone bands.
FIG. 1(b) depicts the ratio of absorption cross sections for the spectra of FIG. 1(a).

FIG. 1(a) depicts spectra of $^{13}CH_3NC$ and $^{12}CH_3NC$ $5\nu_{CH}$ overtone bands for sample gas pressure of 13.3 kPa, showing an isotope shift of about 45 cm$^{-1}$. Thus, isotope-selective absorption and isomerization to acetonitrile ($CH_3CN$) which is enriched in either $^{13}C$ or $^{12}C$ is feasible. Specifically, excitation at 740 nm, where $\sigma^{13}/\sigma^{12}=1.9$, yields $CH_3CN$ enriched in $^{13}C$. Alternatively, if the laser is tuned to 725 nm, $\sigma^{13}/\sigma^{12}<1$ and isotope-selective absorption and isomerization yield $CH_3CN$ which is enriched in $^{12}C$. The useful wavelength range extends from about 720 to 745 nm.

Figure 2:
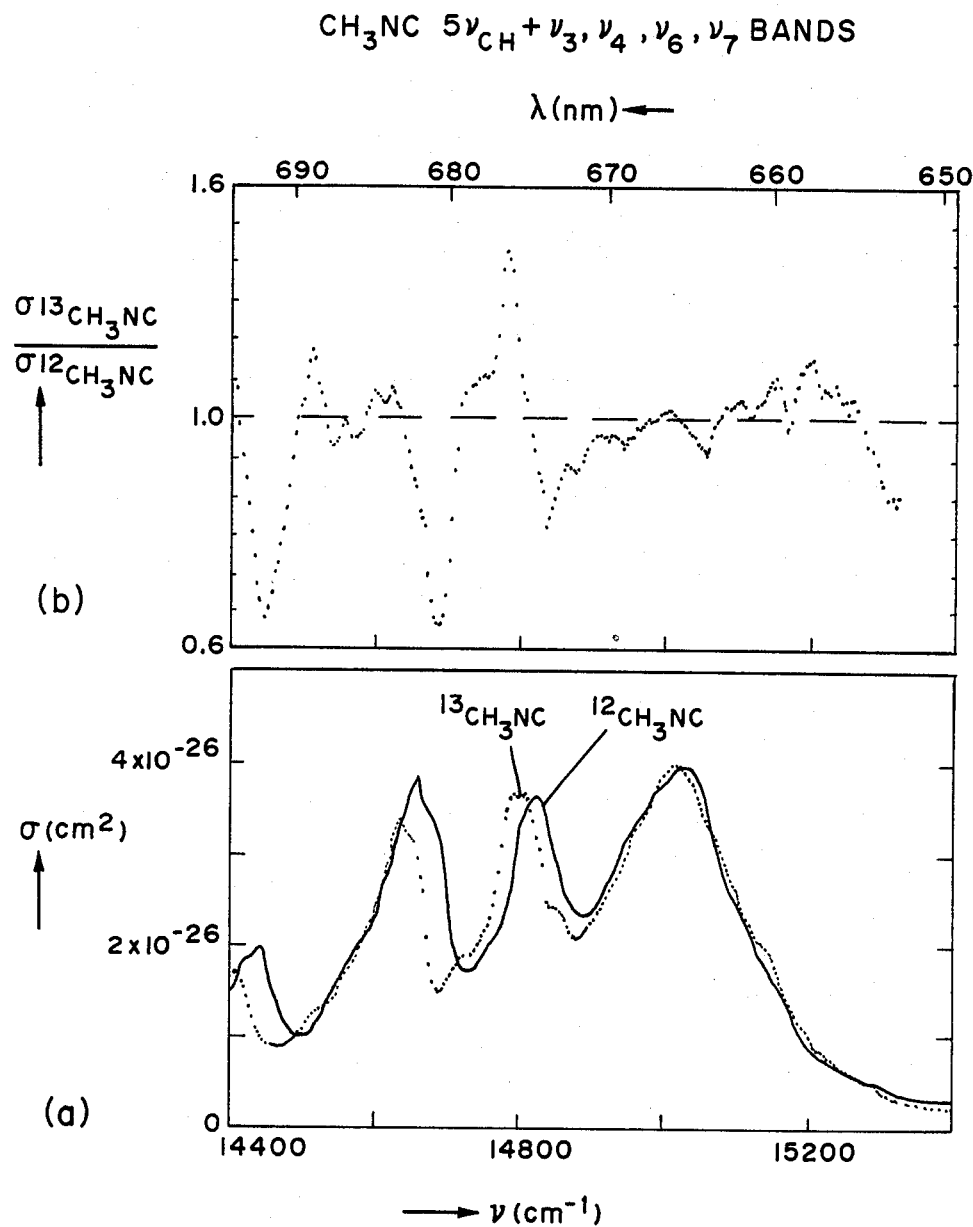
FIG. 2(a) depicts the photoacoustic spectra of $^{13}CH_3NC$ and $^{12}CH_3NC$ $5\nu_{CH}+\nu_3,\nu_4,\nu_6,\nu_7$ combination bands.
FIG. 2(b) depicts the ratio of absorption cross sections for the spectra of FIG. 2(a).
Figure 3:
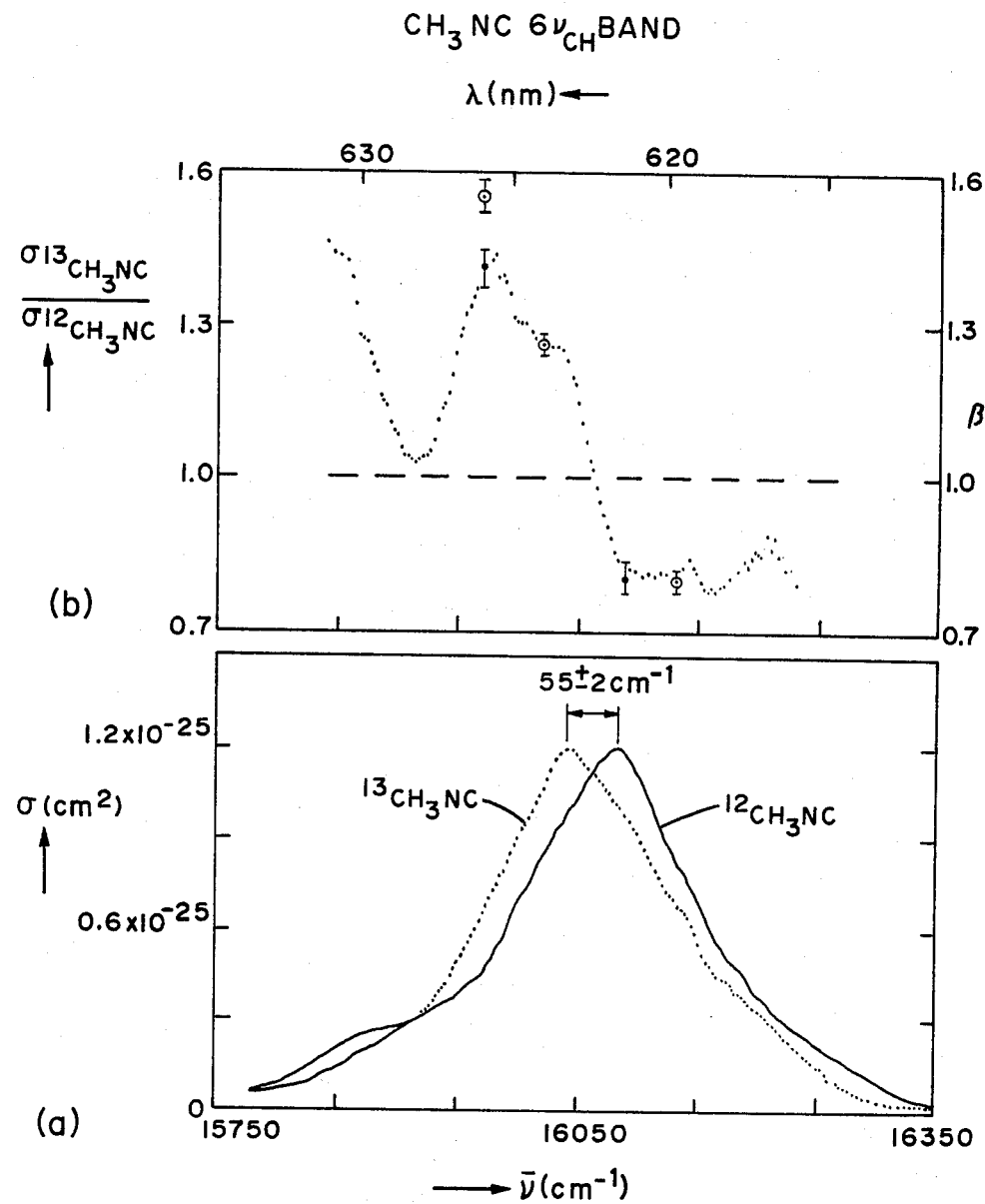
FIG. 3(a) depicts the photoacoustic spectra of $^{13}CH_3NC$ and $^{12}CH_3NC$ $6\nu_{CH}$ overtone bands.
FIG. 3(b) depicts the ratio of absorption cross sections for the spectra of FIG. 3(a).

FIGS. 2(a) and 3(a) depict the photoacoustic absorption spectra of $CH_3NC$ in two other spectral regions in which isotope-selective excitation is possible. FIG. 2 depicts the combination bands, $5\nu_{CH}+\nu_3,\nu_4,\nu_6,\nu_7$ for gas pressure of 17.3 kPa. Irradiation in the range of about 650 to 700 nm yields selective excitation of either $^{13}CH_3NC$ or $^{12}CH_3NC$, depending on whether $\sigma^{13}/\sigma^{12}$ is greater or less than unity, respectively.

FIG. 3(a) depicts the absorption spectra of the $6\nu_{CH}$ band of $CH_3NC$ for gas pressure of 17.3 kPa. The isotope shift for that band is about 55 cm$^{-1}$. Irradiation in the range of about 615 to 635 nm yields selective excitation of either $^{13}CH_3NC$ or $^{12}CH_3NC$, depending on whether $\sigma^{13}/\sigma^{12}$ is greater or less than unity, respectively.

The shifts observed in the C-H stretch bands for carbon and hydrogen isotopes are not observed in $CH_3NC$ containing nitrogen isotopes. For example, in $CH_3^{15}NC$, the combination bands and $\nu_{CH}$ bands exhibit no nitrogen isotope shift (within experimental error of $\pm 3$ cm$^{-1}$). The $CH_3^{15}NC$ spectrum is indistinguishable from the natural abundance $CH_3NC$ spectrum, which is primarily $CH_3^{14}NC$.

The above results indicate that the observed $CH_3NC$ overtone bands correspond to vibrational motion localized primarily within the methyl group. The active overtone modes are those involving C-H motion exclusively, which is in direct contrast to the fundamental spectroscopy, where $\nu_2$(N≡C stretch) is the strongest absorption feature. These observations are in agreement with predictions of a local mode description for the high vibrational states of $CH_3NC$.

If excited molecules collide with and transfer their energy to unexcited molecules, isotopic scrambling results with a corresponding loss of selectivity. Scrambling is minimized when (isotope-selective) isomerization rates are high, collisional encounter rates and energy transfer probabilities are low. Isomerization rates increase with increasing photon energy. Thus, for example, isomerization rates are higher for excitation of the $6\nu_{CH}$ band than the $5\nu_{CH}$ band. However, since absorption cross sections are generally lower for the higher states, high laser power is needed. Thus, intracavity excitation is desirable, since about 200 times greater photon density is available in this mode than with extra-cavity excitation.

In general, collisional encounter rates can be minimized by reducing gas pressure; however, reduced pressure means reduced isotope production. Compared with earlier processes, the present invention does not require that pressures be as low, because energy transfer probabilities are low. Depending on whether excitation is in the $5\nu_{CH}$ or $6\nu_{CH}$ band (corresponding to ~160–200 kJ/mole), isotopic scrambling requires the transfer of 5 or 6 vibrational quanta in a single collision, which are highly improbable processes. Typically, in a single collision, the transfer of energy in small packets, containing only a fraction (~30 kJ/mole) of the initial energy, dominates over transfer of the entire energy in multiple quanta exchange processes. Thus, the intracavity excitation technique prepares molecules which are nearly "immune" to isotopic scrambling. Specifically, there is negligible isotopic scrambling when the $5\nu_{CH}$ band is excited at pressures of 1 kPa and even higher. The $6\nu_{CH}$ band can be used for isotope enrichment with pressures up to 40 kPa and higher.

The same photoisomerization procedure used to separate isotopes when $CH_3NC$ is the gaseous medium is also suitable when allyl isocyanide is the medium. Natural abundance allyl isocyanide (i.e. most carbon atoms $^{12}C$) has $6\nu_{CH}$ olefinic absorptions at 600.0 nm ($CH_2$) and 607.5 nm (CH) and $5\nu_{CH}$ olefinic absorptions at 705.8 and at 715.0 nm. If $^{13}C$ is substituted at the terminal $CH_2$ position, these peaks are shifted to 602.0, 609.5, 708.0 and 717.2 nm, respectively. Thus irradiation in the ranges of about 595 to 615 nm or 700 to 725 nm gives product 3-butenonitrile enriched at the terminal position in either $^{13}C$ or $^{12}C$, depending on which molecule has the greater vibrational absorption. Similarly, other absorption bands can be irradiated to give product enriched in $^{13}C$ or $^{12}C$ at other positions.

Although photoisomerization, as described above, is an attractive unimolecular reaction for practicing this invention, other unimolecular reactions are suitable as well, for example, photofragmentation, involving multiple bond-breaking, and photodissociation, generally involving the breaking of a single bond. The former reaction permits separation of carbon isotopes in such gases as, for example, cyclohexadiene and cyclobutanone. The latter reaction permits separation of carbon isotopes in gaseous methyl iodide ($CH_3I$) and boron isotopes in gaseous trifluorophosphineborane ($H_3BPF_3$). The appropriate excitation wavelength can readily be determined from absorption spectra of the molecules containing the isotopes to be separated. For example, photofragmentation of cyclohexadiene is accomplished with an excitation wavelength of about 612 nm.

Excitation of the unimolecular reactants in the process of this invention is accomplished using any high average power laser emitting in the range from about 400 to 1000 nm. Suitable lasers include tunable lasers such as cw or pulsed dye or free electron lasers, and lasers of limited tunability such as ion lasers. Suitability of lasers with limited tunability depends on the laser photon energy corresponding to an isotope-selective absorption energy in the molecule.

The following examples are presented in order to illustrate how the invention may be carried out. The specific techniques, conditions, materials, and reported data set forth to illustrate the principles and practice of the invention are exemplary and should not be construed as limiting the scope of the invention.

EXAMPLE 1

Gaseous $CH_3NC$ (>99.9% pure) was introduced into a cell 26.5 cm long, 1.4 cm diameter incorporating a photoacoustic detector inside the cavity of a cw dye laser pumped by either an argon or krypton ion laser. Rhodamine dyes 6G and 101 pumped by 4–11 W of 514.5 nm radiation from an argon ion laser (Coherent Radiation Model CR-18) were used in the spectral ranges 580–640 nm and 630–700 nm, respectively. Oxazine 1 pumped by 6 W of red multiline (647.1 nm/675.9 nm) output from a krypton ion laser (Spectra Physics Model 171-01) was employed for the spectral range 700–800 nm. The output coupler was ~1% transmitting, and the intra-cavity power was ~200 W. The dye laser wavelength was tuned with a three-element birefringent filter which gave ~0.05 nm band width. Following timed irradiations, the cell was transferred to a gas-handling manifold mounted on the inlet port of a gas chromatograph/mass spectrometer for analysis and determination of isotope enrichment factor. The enrichment factor, $\beta$, is defined by $$\beta = \frac{[^{13}CH_3CN/^{12}CH_3CN]\ product}{[^{13}CH_3NC/^{12}CH_3NC]}$$

before irradiation Since prolonged irradiation would ultimately convert all the $CH_3NC$ to $CH_3CN$, it is clear that the experimentally determined values of $\beta$ for high conversion percentages must be corrected to low conversion (say 1–10%). Conversion percentages and (corrected) enrichment factors, $\beta$, for different excitation wavelengths and sample pressures are shown in the table.

| λ (nm) | P (kPa) | Percent Conversion to $CH_3CN$ | β |
| --- | --- | --- | --- |
| 621.4 | 4.7 | 25 | 0.80 |
| 626.0 | 2.0 | 25 | 1.41 |
| 730.0 | 0.17 | 30 | 1.37 |
| 739.2 | 1.1 | 40 | 1.70 |

For a given excitation wavelength, there is good agreement between values of $\beta$, shown as solid circles in FIGS. 1(b) and 3(b), and values of absorption cross section ratio. This agreement is very significant, since it indicates that isotopic scrambling due to collisions or other de-excitation modes is negligible.

EXAMPLE 2

Two identical cells were placed in the laser cavity of the apparatus described in Example 1. One cell contained $^{13}CH_3NC$ and the other $^{12}CH_3NC$ at the same total pressure. Excitation wavelengths were 725.0, 733.0, and 739.2 nm for the $5\nu_{CH}$ band and 620.0, 624.0, and 626.0 nm for the $6\nu_{CH}$ band. Sample pressures were 0.13 kPa and 0.65 kPa for the $5\nu_{CH}$ and $6\nu_{CH}$ irradiations, respectively. The irradiated samples were analyzed by GC to obtain the ratio of absorption cross sections $\sigma^{13}/\sigma^{12}$, which are shown as open circles in FIGS. 1(b) and 3(b). There is good agreement between the measured values of the ratio and the values based on the absorption spectra. Absorption cross section values were determined by the method described by K. V. Reddy and M. J. Berry, Faraday Disc. Chem. Soc. 67, 109 (1979).

We claim:
1. A process for producing isotopically enriched material which comprises:
    (a) exposing a gaseous composition comprising a particular isotope of an element and at least one other isotope of the same element, said isotopes being bound to hydrogen in a polyatomic molecule, to laser radiation of a predetermined wavelength in the range from about 400 nm to about 1000 nm, which radiation, by direct one-photon excitation, preferentially excites molecules containing said particular isotope of said element to an excited vibrational state of the ground electronic state, thereby converting said excited molecules by photofragmentation to a form in which they may be separated from the nonexcited molecules; and
    (b) separating said converted molecules from said nonexcited molecules.
2. The process of claim 1 wherein said gaseous composition comprises cyclohexadiene.
3. The process of claim 1 wherein said gaseous composition comprises cyclobutanone.

* * * * *